Patented Oct. 6, 1936

2,056,593

UNITED STATES PATENT OFFICE 2,056,593

3.3'-DICHLORINDANTHRONE AND PROCESS OF PRODUCING THE SAME

William Smith and John Thomas, Grangemouth, Scotland, assignors to Scottish Dyes, Limited, Grangemouth, Scotland No Drawing. Application March 22, 1928, Serial No. 263,952. In Great Britain April 1, 1927

4 Claims. (Cl. 260—31)

This invention relates to the production of dyestuffs and dyestuff intermediates and includes the employment of bodies for dyeing and printing.

The invention principally relates to anthraquinone hydroazines.

Ever since its introduction on the market, anthraquinone hydroazine has been recognized as one of the most valuable vat dyestuffs on account of its excellent fastness to light and washing. It is also a vat dyestuff which can be readily printed. It suffers, however, from a defect, namely that it is sensitive to the action of bleaching agents, the shade being turned considerably greener by the action of a slight bleach.

Attempts to overcome this defect have been made and it was early found that by halogenation bodies were formed, namely halogenated anthraquinone hydroazines which possessed superior properties from the point of view of fastness to bleach, while still retaining the desirable properties of the parent body as regards fastness to light and washing. It was found, however, that the production of halogenated anthraquinone hydroazines, by treating the parent body with halogenating agents or with the halogens themselves, results in a product which differs slightly in shade from that of the parent body. Moreover, the fastness to bleach cannot be described as being completely satisfactory, and experience has shown that if the halogenation is carried through to a high degree it materially affects the dyeing and printing properties of the resulting product.

If anthraquinone hydroazine be brominated to the dibrom stage, for instance, a product is obtained which is difficult to print satisfactorily. In the case of chlorine derivatives, if tri- and tetrachlor derivatives are prepared by halogenation, the products are not readily printed by the standard methods.

The object of the present invention is to provide an anthraquinone hydroazine derivative of satisfactory fastness to bleach and also capable of being readily printed.

To that end we have made experiments, as a result of which we have found that for this purpose it is of importance to prepare products in which the halogen has entered into positions where their effect in increasing the fastness to bleach property is greatest, and also into such places where the substituents have the minimum effect on the shade of the parent body.

In the course of our researches we have found that if the hydrogen atoms in the 3.3' positions of anthraquinone hydroazine, that is ortho to the imino groups, are replaced by chlorine, a product is obtained which differs but slightly in redness and brightness from the parent body. Moreover the product can be readily printed by known methods and the resulting fabrics are of superior fastness to bleach than those obtained from any other anthraquinone hydroazine.

We have also found that if the hydrogen in the $\alpha$ positions in the anthraquinone hydroazine, for example the 4.4' positions, is replaced by halogen, the effect of substitution in these positions is to give a product of considerably greener shade than the parent body, and moreover the effect of chlorine in such positions has but slight protective effect on the imino groups whilst the fastness to bleach of the resulting product is not so great as when the positions ortho to the imino groups are substituted.

We have found, however, that if this desirable 3.3'-dichlor-anthraquinone hydroazine is prepared synthetically from 1-brom-2-amino-3-chlor anthraquinone prepared, for instance by the bromination in the normal way of 2-amino-3-chlor anthraquinone, which may be prepared by the processes of British specification No. 264,916 (18597/25) having a melting point of about 310–312° C., the resulting dichlor-anthraquinone hydroazine can be obtained in a form which, after a simple purification from the small amount of by-products formed in the reaction, is ready for use.

The resulting product dyes bright reddish shades of blue which approximate closely in tone to those of anthraquinone hydroazine itself, and moreover the shades are of good fastness to bleach.

The invention in brief consists in a process for preparing 3:3'-dichlor-anthraquinone hydroazine which comprises mixing sodium acetate and copper acetate with 1-brom-2-amino-3-chlor-anthraquinone of a quality such as is obtained by condensing 3-amino-4-chlor-benzoyl-benzoic acid in the presence of sulphuric acid, hydrolyzing the sulphate formed, separating the $\beta$-aminochlor-anthraquinone and brominating the same, grinding the aforesaid sodium acetate, copper acetate and 1-brom-2-amino-3-chlor-anthraquinone together, adding ortho-nitro-toluene, stirring until dyestuff formation is complete, filtering off the product and washing the same.

The invention includes as a new body 3.3'-dichlor-anthraquinone hydroazine prepared in substantially pure form.

The following example illustrates how the invention may be carried into effect, all parts being parts by weight:—

*Example*

This example illustrates the preparation of 3.3'-dichlor-anthraquinone hydroazine from 1-brom-2-amino-3-chlor-anthraquinone.

According to this example, 30 parts of 1-brom-2-amino-3-chlor-anthraquinone are mixed with 15 parts of anhydrous sodium acetate and 3 parts of copper acetate. After being well ground together they are added to 300 parts of ortho nitro toluene. The mixture is stirred at 160–170° C. until no more formation of dyestuff takes place. This usually takes several hours.

The product is filtered off, washed thoroughly with ortho nitro toluene, methylated spirits and water.

When freed from the small amount of by-products that are formed, the product is found by analysis to contain about 13.88 per cent. of chlorine so that it consists of substantially pure 3.3'-dichlor-anthraquinone hydroazine.

It dyes cotton a bright reddish blue shade from a hydrosulphite vat and the dyeings possess great fastness to chlorine.

*General*

Modifications may be made in the process described above for example in place of copper acetate other copper salts or in place of sodium acetate other acid absorbers may be employed.

3.3'-dichlor-anthraquinone hydroazine such as may be prepared by the process herein described may be employed for dyeing, printing or generally for coloring matters both textile fibres and other bodies.

It may be applied as found suitable either by the usual processes of dyeing or printing or as a pigment.

The blue dyestuff prepared by processes substantially as described may contain, when pure, 13.89 per cent. of chlorine; dissolves in warm sulphuric acid to a dull olive-brown solution, from which purple crystals with a brownish lustre separate on dilution to about 83 per cent. sulphuric acid content and from which blue flocks separate on infinite dilution; which gives a greenish-blue alkaline vat from which fabrics are dyed greenish-blue shades which oxidize in the air to give brilliant blue dyeings that are highly resistant to light, washing and chemick and is practically insensitive to calcareous water in the vat.

The reaction which takes place in the example above given may be represented as follows:

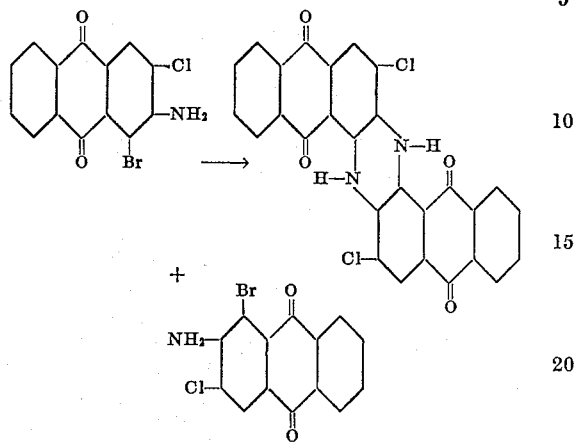

Having now described our invention, what we claim as new and desire to secure by Letters Patent is:—

1. In the process for preparing substantially pure 3,3'-dichloro-N-dihydro-1,2,2',1'-anthraquinone azine, the step which comprises condensing 1-bromo-2-amino-3-chloro-anthraquinone.

2. In the process for preparing substantially pure 3,3'-dichloro-N-dihydro-1,2,2',1'-anthraquinone azine, the step which comprises condensing 1-bromo-2-amino-3-chloro-anthraquinone in the presence of a copper catalyst by heating the same in ortho-nitro-toluene in the presence of anhydrous sodium acetate and a copper catalyst at a temperature of from 160 to 170° C.

3. The process for preparing substantially pure 3,3'-dichloro-N-dihydro-1,2,2',1'-anthraquinone azine, which comprises condensing a 1-bromo-2-amino-3-chloro-anthraquinone having a melting point of about 210–212° C., the condensation being effected by heating the 1-bromo-2-amino-3-chloro-anthraquinone in ortho-nitro-toluene in the presence of anhydrous sodium acetate and a copper catalyst at a temperature of from 160 to 170° C.

4. A dichloro-N-dihydro-1,2,2',1'-anthraquinone azine containing substantially two atoms of chlorine per molecule, all of which is in the 3,3' positions and obtained by condensation of 1-bromo-2-amino-3-chloro-anthraquinone, said dichloro-anthraquinone azine being characterized by being superior, in the combined properties of bleach fastness and insensitivity to calcareous water in the vat, to the known halogenated indanthrone dyestuffs heretofore produced.

WILLIAM SMITH.
JOHN THOMAS.

CERTIFICATE OF CORRECTION.

Patent No. 2,056,593. October 6, 1936.

WILLIAM SMITH, ET AL.

It is hereby certified that error appears in the printed specification of the above numbered patent requiring correction as follows: Page 2, second column, lines 35 and 36, claim 2, strike out the words "in the presence of a copper catalyst" and insert the same after "anthraquinone" and before the period in line 31, claim 1; and that the said Letters Patent should be read with this correction therein that the same may conform to the record of the case in the Patent Office.

Signed and sealed this 22nd day of December, A. D. 1936.

Henry Van Arsdale (Seal) Acting Commissioner of Patents.